(12) United States Patent
Shao et al.

(10) Patent No.: US 12,045,036 B2
(45) Date of Patent: Jul. 23, 2024

(54) INDUSTRIAL INTERNET OF THINGS, CONTROL METHOD, AND MEDIUM FOR AUTOMATICALLY CONTROLLING WORKING PARAMETERS OF MANUFACTURING DEVICE

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yaqiang Quan, Chengdu (CN); Xiaojun Wei, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/485,326

(22) Filed: Oct. 12, 2023

(65) Prior Publication Data
US 2024/0036554 A1    Feb. 1, 2024

Related U.S. Application Data

(63) Continuation of application No. 18/172,273, filed on Feb. 21, 2023, now Pat. No. 11,846,931.

(30) Foreign Application Priority Data

Aug. 24, 2022    (CN) .......................... 202211015340.2

(51) Int. Cl.
| G05B 19/4155 | (2006.01) |
| G16Y 10/25 | (2020.01) |
| G16Y 20/20 | (2020.01) |

(52) U.S. Cl.
CPC .................. *G05B 19/4155* (2013.01); *G05B 2219/31103* (2013.01); *G16Y 10/25* (2020.01); *G16Y 20/20* (2020.01)

(58) Field of Classification Search
None
See application file for complete search history.

(56) References Cited

U.S. PATENT DOCUMENTS

2016/0357523 A1    12/2016 Zhang et al.
2020/0272705 A1*    8/2020 Rakuff ................... G06N 20/00

FOREIGN PATENT DOCUMENTS

| CN | 107657681 A | 2/2018 |
| CN | 111217298 A | 6/2020 |

(Continued)

OTHER PUBLICATIONS

Yang, Aimin et al., IOT System for Pellet Proportioning Based on BAS Intelligent Recommendation Model, IEEE Transactions on Industrial Informatics, 2019, 9 pages.

(Continued)

*Primary Examiner* — Ryan A Jarrett
(74) *Attorney, Agent, or Firm* — PORUS IP LLC

(57) ABSTRACT

The present disclosure discloses an Industrial Internet of Things, a control method, and a medium for automatically controlling working parameters of a manufacturing device. The Industrial Internet of Things may include an obtaining module and a determination module, wherein the obtaining module is configured to obtain a finished product-required parameter information and a user instruction, wherein the finished product-required parameter information includes finished gear-required parameter information of a gear machining device; and the determination module is configured to: obtain historical relating data information; determine a plurality of initial parameter combinations; and determine a target parameter combination of a gear process- (Continued)

ing process by a preset algorithm; generate combined data of the manufacturing device based on at least one of the target parameter combination of the gear processing process, a target parameter combination of a screw machining process, and a target parameter combination of a bearing machining process.

20 Claims, 6 Drawing Sheets

(56) References Cited

FOREIGN PATENT DOCUMENTS

| | | | |
|---|---|---|---|
| CN | 111580479 | A | 8/2020 |
| CN | 113141301 | A | 7/2021 |
| CN | 114449023 | A | 5/2022 |
| CN | 114663250 | A | 6/2022 |
| CN | 114820225 | A | 7/2022 |
| CN | 114827213 | A | 7/2022 |
| EP | 3792708 | A1 | 3/2021 |

OTHER PUBLICATIONS

Shao, Zehua et al., IOT Management Platform, Internet of Things Technologies, 2021, 5 pages.
Gao, Xueqin, Design of Manufacturing Enterprise Production Management System Based on Internet of Things, Xinxijishu, 46-50 &57, 2021.
Decision to Grant a Patent in Chinese Application No. 202211015340.2 mailed on Oct. 10, 2022, 8 pages.

* cited by examiner

```
┌─────────────────────────────────────────────────────────────┐
│ After the user platform sends the first instruction, the general platform of the
│ service platform extracts the plurality of working parameter item information
│ in the first instruction, and sends the plurality of working parameter item        ⟩ S1
│ information to the different sub-platforms of the service platform, respectively;
│ the working parameter item information includes at least the working
│ parameter item as well as its corresponding value or value interval.
└─────────────────────────────────────────────────────────────┘
                                    ↓
┌─────────────────────────────────────────────────────────────┐
│ The sub-platform of the service platform receives the working parameter item
│ information and perform data processing to obtain the one or more sub-
│ parameter information, and sends the one or more sub-parameter information          ⟩ S2
│ as the parameter dataset of the working parameter item to the general platform
│ of the management platform
└─────────────────────────────────────────────────────────────┘
                                    ↓
┌─────────────────────────────────────────────────────────────┐
│ The general platform of the management platform obtains the parameter dataset of all
│ the working parameter items, takes all the working parameter items as the extraction
│ elements, extracts one sub-parameter information from the parameter datasets
│ corresponding to all the extraction elements, respectively, obtains several groups of
│ combined data by performing permutation and combination on the sub-parameter         ⟩ S3
│ information, sorts and numbers all the combined data to form a combined dataset and
│ store the combined dataset, wherein the repeated combined data in the combined
│ dataset may retain one, and the general platform of the management platform may
│ send the combined data in the combined dataset to different sub-platforms of the
│ management platform in order based on the combined dataset
└─────────────────────────────────────────────────────────────┘
                                    ↓
┌─────────────────────────────────────────────────────────────┐
│ After receiving the combined data, the sub-platform of the management platform
│ stores the combined data by number, extracts different working parameter item
│ information of the combined data to form the plurality of working parameter item data, ⟩ S4
│ and packages the stored number information and the plurality of working parameter
│ item data as the execution parameter data of the object platform and sends it to the sub-
│ platform of the sensor network platform
└─────────────────────────────────────────────────────────────┘
                                    ↓
┌─────────────────────────────────────────────────────────────┐
│ The sub-platform of the sensor network platform receives the execution
│ parameter data and converts it into the configuration file recognized by the        ⟩ S5
│ object platform, and sends the configuration file to the general platform of the
│ sensor network platform
└─────────────────────────────────────────────────────────────┘
                                    ↓
┌─────────────────────────────────────────────────────────────┐
│ The general platform of the sensor network platform receives the configuration
│ file and sends it to the corresponding object platform, the object platform         ⟩ S6
│ receives the configuration file and adjusts the working parameter based on the
│ working parameter item data in the configuration file
└─────────────────────────────────────────────────────────────┘
```

FIG. 3

INDUSTRIAL INTERNET OF THINGS, CONTROL METHOD, AND MEDIUM FOR AUTOMATICALLY CONTROLLING WORKING PARAMETERS OF MANUFACTURING DEVICE

CROSS-REFERENCE TO RELATED APPLICATIONS

This application is a continuation of U.S. application Ser. No. 18/172,273, filed on Feb. 21, 2023, which claims priority of the Chinese Patent Application No. 202211015340.2, filed on Aug. 24, 2022, the contents of each of which are incorporated herein by reference.

TECHNICAL FIELD

The present disclosure generally relates to intelligent manufacturing technology, and in particular, to an Industrial Internet of Things, control method, and medium for automatically controlling working parameters of a manufacturing device.

BACKGROUND

In the field of machinery manufacturing, the working environment is the primary consideration point in the manufacture of many materials and products. The parameters corresponding to the working environment may affect the product manufacturing data of the final product.

In manufacturing, different manufacturing products involved in different processes and different devices have different working parameters. There may be a plurality of working parameters involved in each process or each device. Most of the working parameters are separately controlled by a value or a value interval (e.g., some devices without the fixed value, which will be floated up and down in a certain interval).

To obtain optimal parameters of these working parameters, most of the working parameters in the manufacturing process of a product are calculated by manual or computer to get approximate value ranges, and then through continuous simulation experiments, until the optimal parameter values or parameter interval values are found, which is extremely time-consuming and labor-intensive, and cannot be produced during the test process, resulting in an increase in cost. In addition, the optimal parameter values or parameter interval values can be found individually for the plurality of working parameters and then all the optimal parameter values or parameter interval values are combined to conduct the simulation test. This may not only cause the above-mentioned problems but also lead to the uncertainty caused by the combined parameters, resulting in the inaccuracy of the parameter data, the parameter data needs to be re-selected and deployed, which is extremely time-consuming and labor-intensive.

In addition, some of the optimal parameter values or parameter interval values will change after long-term use of the device due to device use time, device wear, etc., which requires real-time adjustment, but the adjustment process is time-consuming and labor-intensive.

Moreover, the parameters of some devices are limited to a certain interval, no further limitation. Since the optimal parameters are generally a certain value or a small interval, some devices do not achieve the optimal working environment during product manufacturing, which affects the final product manufacturing data of the product, and thus affects the product quality, etc. In addition, some devices also involve multiple different parameters, and these parameters may interact with each other, which may further affect the product manufacturing data.

Based on this, how to realize the deployment or regulate of the working parameters of the device quickly and effectively in combination with intelligent manufacturing is an urgent need for us to solve.

SUMMARY

The technical problem to be solved by the present disclosure may be to provide an Industrial Internet of Things, a control method, and a medium for automatically controlling working parameters of a manufacturing device. The Internet of Things may be decomposed and combined according to the plurality of different working parameter items involved in devices to form several combined data, the combined data may be used as the working parameters of multiple manufacturing devices with the same type, and carry out product manufacturing at the same time. During the manufacturing process, the optimal value corresponding to the working parameter may be obtained based on the product manufacturing data, and the optimal selection of working parameter may be realized under the condition of ensuring production so that the working parameters of all the manufacturing devices may be further deployed, regulated, or determined.

One of the embodiments of the present disclosure may provide an Industrial Internet of Things for automatically controlling working parameters of a manufacturing device, the Industrial Internet of Things includes: an obtaining module and a determination module, wherein the obtaining module is configured to obtain a finished product-required parameter information and a user instruction, wherein the finished product-required parameter information includes finished gear-required parameter information of a gear machining device; and the determination module is configured to obtain historical relating data information based on the finished gear-required parameter information and the user instruction; determine a plurality of initial parameter combinations based on the historical relating data information, wherein the initial parameter combination includes at least one of forging time, normalizing temperature, quenching temperature, and tempering temperature; determine a target parameter combination of a gear processing process by a preset algorithm based on the plurality of initial parameter combinations; and generate combined data of the manufacturing device based on at least one of the target parameter combination of the gear processing process, a target parameter combination of a screw machining process, and a target parameter combination of a bearing machining process.

The present disclosure may be realized through the following technical solutions. The Industrial Internet of Things for automatically controlling working parameters of a manufacturing device, comprises: a user platform, a service platform, a management platform, a sensor network platform, and an object platform that interacts from top to bottom; the obtaining module may be executed by the user platform and the service platform, and the determination module may be executed by the user platform, the service platform, the management platform, the sensor network platform, and the object platform.

The service platform and the management platform may be arranged in a front sub-platform layout, and the sensor network platform may be arranged in a rear sub-platform layout; the front sub-platform layout may refer to the corresponding platform is provided with a general platform and a plurality of sub-platforms, the plurality of sub-platforms store and process data of different types or different receiving objects sent by a lower platform, respectively, and the general platform may store and process the data from the plurality of sub-platforms after summarizing, and may transmit the data to an upper platform; and the rear sub-platform layout may refer to the sensor network platform is provided with a general platform and a plurality of sub-platforms, the plurality of the sub-platforms may store and process data of different types or different receiving objects sent by the management platform, respectively, and the general platform may store and process the data of the plurality of sub-platforms after summarizing, and may transmit the data to the object platform; the object platform may be configured as a manufacturing device with the same type in the intelligent manufacturing.

After the user platform sends the first instruction, the general platform of the service platform may extract a plurality of working parameter item information in the first instruction, and may send the plurality of working parameter item information to different sub-platforms of the service platforms, respectively; the working parameter item information may include at least the working parameter item as well as a value or a value interval corresponding to the working parameter item.

The sub-platform of the service platform may receive the working parameter item information and perform data processing to obtain one or more sub-parameter information, and may send the one or more sub-parameter information as a parameter dataset of the working parameter item to the general platform of the management platform.

The general platform of the management platform may obtain the parameter datasets of all the working parameter items, take all the work parameter items as extraction elements, extract one sub-parameter information from the parameter datasets corresponding to all the extraction elements respectively, obtain several groups of combined data by performing permutation and combination on the sub-parameter information, sort and number all the combined data to form a combined dataset and store it, wherein repeated combined data in the combined dataset may retain one, and the general platform of the management platform may send the combined data in the combined dataset to the different sub-platforms of the management platforms in order based on the combined dataset.

After receiving the combined data, the sub-platform of the management platform may store the combined data by number, extract the different working parameter item information of the combined data to form a plurality of working parameter item data, and package stored number information and the plurality of working parameter item data as execution parameter data of the object platform and send it to the sub-platform of the sensor network platform.

The sub-platform of the sensor network platform may receive the execution parameter data and convert it into a configuration file recognized by the object platform, and send the configuration file to the general platform of the sensor network platform.

The general platform of the sensor network platform may receive the configuration file and send it to the corresponding object platform, the object platform may receive the configuration file and adjust the working parameter based on the working parameter item data in the configuration file.

One of the embodiments of the present disclosure may provide a control method of the Industrial Internet of Things for automatically controlling working parameters of a manufacturing device, comprising: obtaining a finished product-required parameter information and a user instruction, wherein the finished product-required parameter information includes finished gear-required parameter information of a gear machining device; obtaining historical relating data information based on the finished gear-required parameter information and the user instruction; determining a plurality of initial parameter combinations based on the historical relating data information, wherein the initial parameter combination includes at least one of forging time, normalizing temperature, quenching temperature, and tempering temperature; determining a target parameter combination of a gear processing process by a preset algorithm based on the plurality of initial parameter combinations; and generating combined data of the manufacturing device based on at least one of the target parameter combination of the gear processing process, a target parameter combination of a screw machining process, and a target parameter combination of a bearing machining process.

One of the embodiments of the present disclosure may provide a non-transitory computer-readable storage medium, wherein the storage medium may store computer instructions, and when the computer instructions are executed by a processor, a computer may realize the control method of the Industrial Internet of Things for automatically controlling working parameters of a manufacturing device.

Compared with the prior art, the beneficial effects of the present disclosure may be as follows: the Industrial Internet of Things, control method, and medium for regulating multi-type of working parameters in the present disclosure, wherein the Industrial Internet of things may be built based on a five-platform structure, and the service platform and the management platform may be arranged as the front sub-platform layout, and the general platform of the two platforms may receive, analyze and processes the data of the upper platform in a unified manner, which may facilitate to independently process and classify the data of the upper platform and each sub-platform. Each sub-platform corresponding to the general platform may run independently of each other, and may be divided into several independent data processing paths based on a required, and then use different paths for different data processing and transmission for different data, so that the data processing pressure of the corresponding the general platform may be shared and the data processing capacity required of each sub-platform may be reduced. It may also ensure the independence of each data, ensure the classified transmission, traceability of data, and classified issuance and processing of instructions, making the structure and data processing of the Internet of Things clear and controllable and facilitating the control and data processing of the Internet of Things. At the same time, the sensor network platform may be arranged in the rear sub-platform layout, which may transmit and process the data of the upper platform through the different sub-platforms of the sensor network platform, and interact with all the object platforms through one general sensor network platform, thereby ensuring that all the data are sent and received uniformly, which may be convenient for data management and the erection of the sensor network platform.

When the present disclosure may be in use, the user may issue a plurality of working parameter items involved in a manufacturing device and their corresponding parameter values or value intervals, and through the processing of the sub-platform of the service platform, the parameter values or value intervals of each working parameter item may be allocated, and one or more sub-parameter information may be obtained.

The general platform of the management platform may group the sub-parameter information according to the count of the working parameter items and combines values to obtain a combined dataset. Using different combined data in the combined dataset, the general platform of the management platform may send these combined data to the corresponding sub-platforms of the sensor network platform, the general platform of the sensor network platform, and the object platform through the different sub-platforms of the management platform. The object platforms may replace the working data of its corresponding working parameter items with the corresponding values or value intervals in the combined data, and then use different object platforms to execute different parameters for manufacturing at the same time. By collecting corresponding product manufacturing data, which may analyze an advantage and a disadvantage of the combined data, find out the optimal combination, and then obtain the optimal ratio of multiple working parameters. The optimal parameter of the device may be selected without simulation and testing, and the product manufacturing may be realized synchronously, which may save manpower, material, and financial resources, and save a lot of parameter screening time.

BRIEF DESCRIPTION OF THE DRAWINGS

The present disclosure may be further described according to the exemplary embodiments. The exemplary embodiments may be described in detail with reference to the accompanying drawings. The embodiment may be not a limiting exemplary embodiment, wherein the same reference numerals represent similar structures in several views of the drawings, and wherein:

FIG. 3 is a flowchart diagram illustrating a control method of an Industrial Internet of Things for regulating multi-type of working parameters according to some embodiments of the present disclosure.

DETAILED DESCRIPTION

In order to make the purpose, technical solutions, and advantages of the present disclosure more clearly understood, the present disclosure will be described in further detail below regarding the embodiments and the accompanying drawings. The schematic embodiments and their descriptions of the present disclosure are only used to explain the present disclosure and are not intended to limit the present disclosure.

Figure 1:
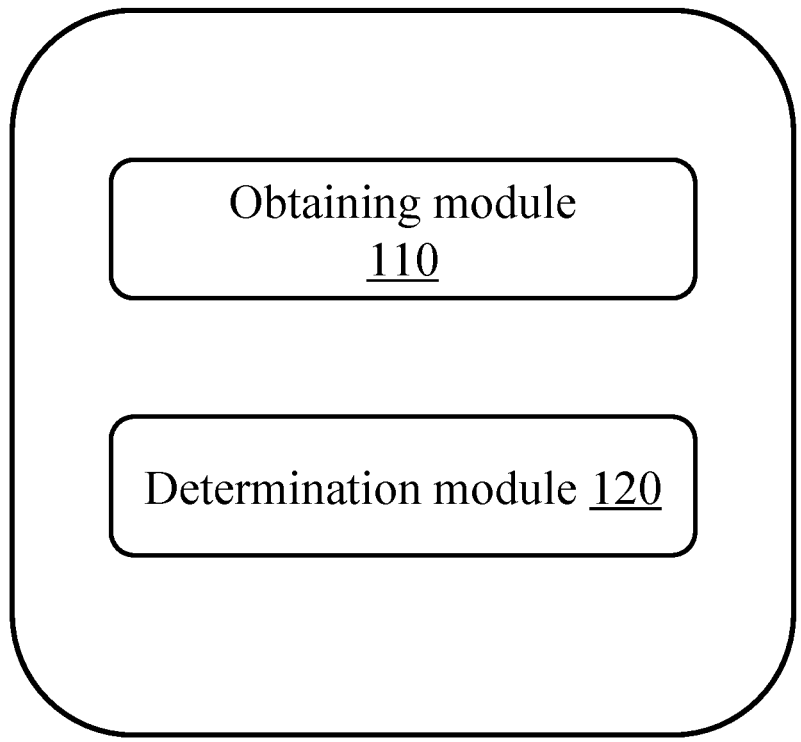
FIG. 1 is a module diagram illustrating an Industrial Internet of Things for regulating multi-type of working parameters according to some embodiments of the present disclosure.

FIG. 1 is a module diagram illustrating an Industrial Internet of Things for regulating multi-type of working parameters according to some embodiments of the present disclosure. As shown in FIG. 1, the Industrial Internet of Things for regulating multi-type of working parameters may include an obtaining module 110 and a determination module 120.

In some embodiments, the obtaining module 110 may obtain a finished product-required parameter information and a user information. The obtaining module may be executed by the user platform and the service platform. More descriptions of the finished product-required parameter information and the user instruction may be found in FIG. 4 and its related sections.

In some embodiments, the user instruction may refer to the relevant instruction that the user uploads to the platform. The user instruction may also include the first instruction. The first instruction may be a plurality of working parameter item information input by the user. The first instruction may be used to adjust a working parameter of a manufacturing device. For more descriptions on adjusting the working parameter of the manufacturing device based on the first instruction, see FIG. 2, FIG. 3 and related sections.

In some embodiments, the determination module 120 may be used to determine combined data of the manufacturing device based on the finished product-required parameter information and the user instruction. The determination module 120 may be executed by the user platform, the service platform, the management platform, the sensor network platform, and the object platform. For more description of the determination module 120 determining the combined data of the manufacturing device, see FIG. 3, FIG. 4, and related sections thereof.

In some embodiments, the manufacturing device may include a gear machining device. The combined data of the manufacturing device may also include the target parameter combination for the gear machining process. The finished product-required parameter information may include finished gear-required parameter information. In some embodiments, the determining module 120 may be further configured to obtain the finished gear-required parameter information and the user instruction; obtain historical relating data information based on the finished gear-required parameter information and the user instruction; determine a plurality of initial parameter combinations based on the historical relating data information, wherein the initial parameter combinations may include at least one of forging time, normalizing temperature, quenching temperature, and tempering temperature; and determine the target parameter combination by a preset algorithm based on the plurality of initial parameter combinations. For more descriptions on determining the target parameter combination based on the finished gear-required parameter information and the user instruction, see FIG. 4, FIG. 5 and related sections.

In some embodiments, the determination module 120 may be further configured to perform multiple rounds of iterative update on the plurality of candidate parameter combinations to determine the target parameter combination. At least one of the multiple rounds of iteration may include: for at least one of the candidate parameter combinations, updating an adjustment increment based on the relationship with the historical optimal solution, and updating the candidate parameter combination based on the adjustment increment, wherein the historical optimal solution may be determined based on an evaluation algorithm. For more descriptions on determining the target parameter combination by performing multiple rounds of iterative update on the plurality of candidate parameter combinations, see FIG. 4, FIG. 5, and related sections thereof.

In some embodiments, the determination module 120 may be further configured to determine fitness based on the candidate parameter combinations, wherein the fitness may be predicted finished product parameter scores of the candidate parameter combinations; based on the finished product parameter scores, evaluate whether each of the candidate parameter combinations is the historical optimal solution. More related descriptions can be found in FIG. 5 and its related sections.

In some embodiments, the predicted finished product parameter scores of the candidate parameter combinations may be determined based on the prediction model. More descriptions of the prediction model can see FIG. 6 and its related sections.

Figure 2:
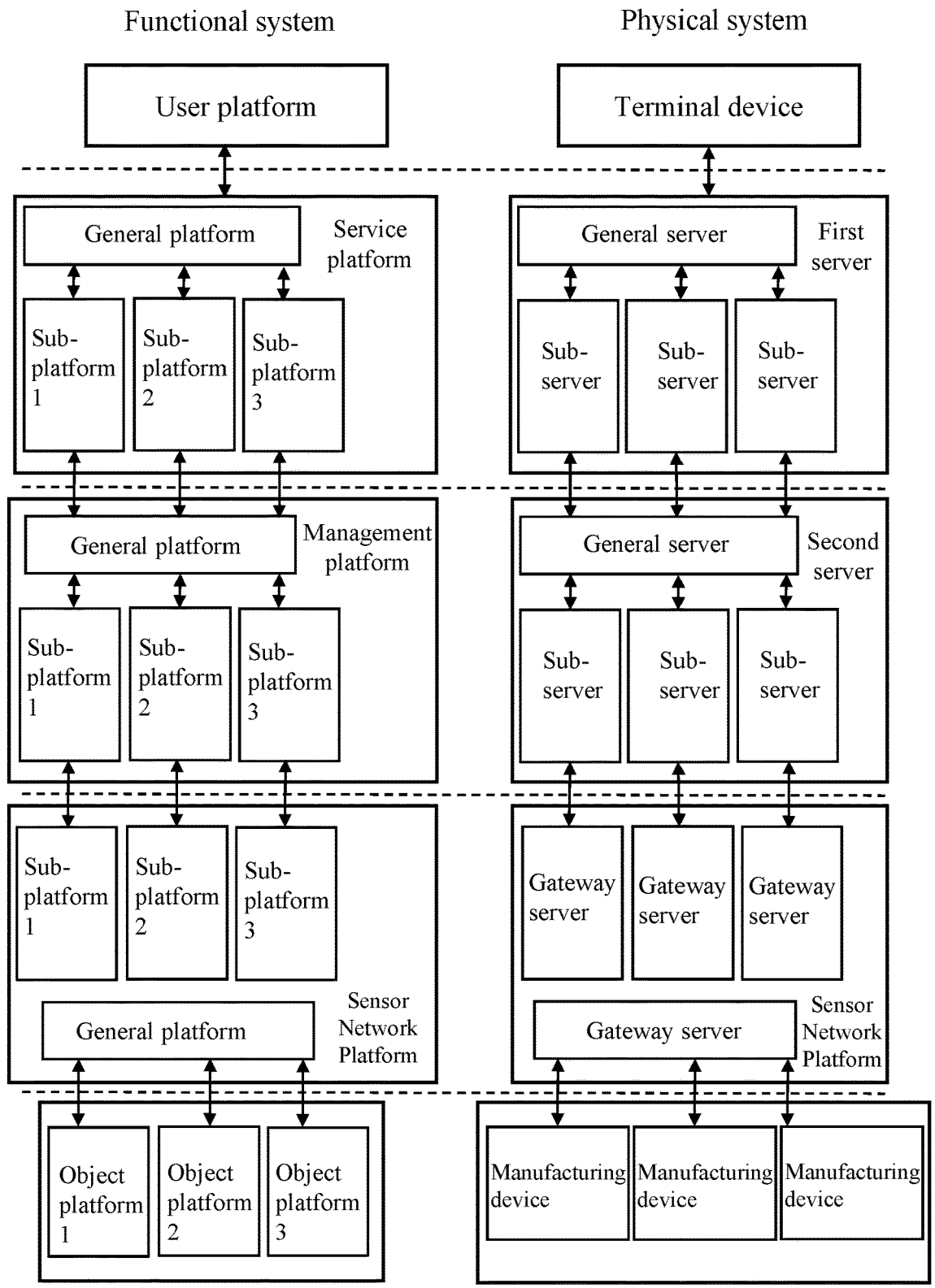
FIG. 2 is a structural framework diagram illustrating an Industrial Internet of Things for regulating multi-type of working parameters according to some embodiments of the present disclosure.

FIG. 2 is a structural framework diagram illustrating the Industrial Internet of Things for regulating multi-type of working parameters according to some embodiments of the present disclosure.

As shown in FIG. 2, an embodiment of the present disclosure may aim to provide the Industrial Internet of Things for regulating multi-type of working parameters, including: the user platform, the service platform, the management platform, the sensor network platform, and the object platform that interact from top to bottom; the obtaining module may be executed by the user platform and the service platform, and the determination module may be executed by the user platform, the service platform, the management platform, the sensor network platform, and the object platform.

The service platform and the management platform may be arranged in the front sub-platform layout, and the sensor network platform may be arranged in the rear sub-platform layout. The front sub-platform layout may refer to the corresponding platform is provided with the general platform and the plurality of sub-platforms, the plurality of sub-platforms may store and process the data of different types or different receiving objects sent by the lower platform, respectively, and the general platform may store and process the data from the plurality of sub-platforms after summarizing, and transmit the data to the upper platform. The rear sub-platform may refer to the sensor network platform is provided with the general platform and the plurality of sub-platforms, and the plurality of sub-platforms may store and process data of different types or different receiving objects sent by the management platform, respectively, and the general platform may store and process the data of the plurality of sub-platforms after summarizing, and transmit the data to the object platform. The object platform may be configured as the manufacturing device with the same type in the intelligent manufacturing.

After the user platform sends the first instruction, the general platform of the service platform may extract the plurality of working parameter item information in the first instruction, and send the plurality of working parameter item information to the different sub-platforms of the service platform, respectively. The working parameter item information may include at least the working parameter item and its corresponding value or value interval.

The sub-platform of the service platform may receive the working parameter item information and perform data processing to obtain the one or more sub-parameter information, and send the one or more sub-parameter information as the parameter dataset of the working parameter item to the general platform of the management platform.

The general platform of the management platform may obtain the parameter datasets of all the working parameter items, take all the working parameter items as extraction elements, and extract one sub-parameter information from the parameter datasets corresponding to all the extraction elements respectively, and obtain several groups of combined data by combining permutation the sub-parameter information, sort and number all the combined data to form a combined dataset and store it, wherein the repeated combined data in the combined dataset may retain one, and the general platform of the management platform may send the combined data in the combined dataset to different sub-platforms of the management platform in order based on the combined dataset.

After receiving the combined data, the sub-platform of the management platform may store the combined data by number, and extract the different working parameter item information of the combined data to form the plurality of working parameter item data, and package the stored number information and the plurality of working parameter item data as the execution parameter data of the object platform and send to the sub-platform of the sensor network platform.

The sub-platform of the sensor network platform may receive the execution parameter data and convert it into a configuration file recognized by the object platform, and send the configuration file to the general platform of the sensor network platform.

The general platform of the sensor network platform may receive the configuration file and send it to the corresponding object platform, and the object platform may receive the configuration file and adjust the working parameter based on the working parameter item data in the configuration file.

It should be noted that, as a physical architecture of the Industrial Internet of Things, specifically: the user platform, which may be configured as a terminal device and interact with the user; the service platform, which may be configured as a first server, receive an instruction from the user platform and send it to the management platform, extract and process an information required by the user platform from the management platform, and send it to the user platform; the management platform, which may be configured as a second server, control the operation of the object platform, and receive feedback data from the object platform; the sensor network platform, which may be configured as a communication network and a gateway and used for the interaction between the object platform and the management platform; the object platform, which may be configured as the manufacturing device with the same type in intelligent manufacturing. Since such the physical architecture belongs to a relatively common structure in the prior art, this embodiment will not describe redundantly.

It should be noted that, the "corresponding" in this embodiment may refer to each manufacturing device corresponds to one sub-platform of the sensor network platform, one sub-platform of the management platform, and one sub-platform of the service platform, and the sub-platforms of different manufacturing device may not be shared. For example, the corresponding data of the manufacturing device 01 may only be transmitted and processed through the sub-platform 01 of the sensor network platform, the sub-platform 01 of the management platform, and the sub-platform 01 of the service platform. The corresponding data of the manufacturing device 02 may only be transmitted and processed through the sub-platform 02 of the sensor network platform, the sub-platform 02 of the management platform, and the sub-platform 02 of the service platform. The data of the manufacturing device 01 will not be transmitted and processed through the corresponding sub-platforms of the manufacturing device 02, they are form independent paths with each other. Unless some special data, such as the subsequent feedback dataset may be uploaded to the sub-platform of the service platform, the corresponding relationship may be ignored based on needs.

In the process of device manufacturing of the prior art, the device may need to provide a certain working environment to ensure product manufacturing. The working environment may be temperature, pressure, medium concentration, depth, PH value (Hydrogen ion concentration), etc., and the working parameter corresponding to these working environment may have allowable working value or value interval, manufacture may be conducted in the corresponding working environment according to the value or value interval during manufacturing. Most of the working values or value intervals of the working parameters may be usually obtained through continuous calculation, experiment and simulation to obtain a better value or value interval, which is not only time-consuming and labor-intensive, but also costly, and the product may not be manufactured during the period. In addition, the final value or value interval may be not optimal, and it may be often a long-term process to continuously improve and repeat calculations, experiments and simulations. Moreover, the device may often have the plurality of working parameter items at the same time to form a complex working environment, due to the mutual influence of various parameters during calculation, the calculation, experiment and simulation may be more complex and inefficient. Finally, for some value intervals, some interval ranges may be large and some interval ranges may be small. Since the optimal parameter generally be a certain value or a very small value interval, which may lead to the fact that such device does not achieve the optimal working environment during product manufacturing, which may affect the final product manufacturing data of the product, and in turn may affect the product quality, etc.

Based on this, the Industrial Internet of Things for regulating multi-type of working parameters in the present disclosure may be built on the basis of a five-platform structure, and the service platform and the management platform in the Internet of Things may be arranged in the front sub-platform layout. The general platform of the two may facilitate to independently process and classify the data of the upper platform by uniformly receiving, analyzing and processing the data of the upper platform, while each sub-platform corresponding to the general platform may operate independently of each other and may be divided into several independent data processing channels based on demand, so as to use different channels for data processing and transmission of different data, and then share the data processing pressure of the corresponding general platform, reduce the data processing capacity requirements of each sub-platform, and also ensure the independence of each data, ensure the classified transmission, traceability of data, and classified issuance and processing of instructions, making the structure and data processing of the Internet of Things clear and controllable, which may facilitate the management, control and data processing of the Internet of Things. At the same time, the sensor network platform may be arranged in the rear sub-platform layout, which may transmit and process the data of the upper platform through different sub-platforms of the sensor network platform respectively, and interact with all object platforms through the general sensor network platform, thereby ensuring that all data may be sent and received uniformly, which may be convenient for data management and the erection of the sensor network platform.

When the present disclosure may be in use, the user may issue multiple work parameter items involved when the device is in manufacturing and their corresponding allowable parameter values or value intervals, and allocate the parameter values or value intervals of each working parameter item through the processing by the sub-platform of the service platform to obtain the one or more sub-parameter information. The general platform of the management platform groups the sub-parameter information according to the count of the working parameter items and performs value combination to obtain the combined dataset. Using different combined data in the combined dataset, the general platform of the management platform may send these combined data to the corresponding sub-platform of the sensor network platform, the general platform of the sensor network platform, and the object platform through the different sub-platforms of the management platforms. The object platforms may replace the working data of the corresponding working parameter item with the corresponding value or value interval in the combined data, and then uses different object platforms to execute different parameters for manufacturing at the same time, which may analyze the advantage and disadvantage of the combined data by collecting the corresponding product manufacturing data, and find out the optimal combination. Then, the optimal proportion of the plurality of working parameters may be obtained, and the optimal parameter of the device may be selected without simulation and experiment, and the product manufacturing may be realized synchronously, which may save manpower, material resource and financial resource, and save a lot of parameter screening time.

Through the above Industrial Internet of Things, the one or more sub-parameter information may be obtained by correspondingly processing the value or value interval corresponding to an issued work parameter item. The sub-parameter information of each working parameter item may be combined into several combined data, and then the combined data may be used to perform manufacturing at the same time; the corresponding combined data may be analyzed or regulated based on the manufacturing result, and the optimal combined data may be selected for manufacturing or used as the basic data for the next regulation. The working parameters may be iteratively updated gradually, so that the working parameters may be continuously improve through manufacturing to obtain the most ideal working parameter of the device, and improve the corresponding data of its manufactured products.

It should be noted that the user platform in this embodiment may be a desktop computer, a tablet computer, a notebook computer, a mobile phone, or other electronic devices capable of data processing and data communication, which is not limited here. In a specific application, the first server and the second server may be a single server or a server cluster, which is not limited here. It should be understood that the data processing process mentioned in this embodiment may be processed by the processor of the server, and the data stored in the server may be stored in a storage device of the server, for example, a hard disk or other memory. In a specific application, the sensor network platform may use a plurality of groups of gateway servers or a plurality of groups of intelligent routers, which are not limited here. It should be understood that the data processing process mentioned in the embodiments of the present disclosure may be processed by the processor of the gateway server, and the data stored in the gateway server may be stored in the storage device of the gateway server, for example, the hard disk or a storage such as an SSD (Solid State Disk).

In some embodiments, the working parameter item may refer to the type of working parameter corresponding to a manufacturing device, for example, temperature, pressure, PH value of medium, etc., the corresponding value may be any natural number, and the value interval may be an interval composed of any two natural numbers of different values.

In some embodiments, in order to facilitate the deployment of multi-type of working parameters, after adjusting the working parameter based on the configuration file, the object platform may obtain the product manufacturing data under the working parameter, and extract serial number information in the configuration file, and package the serial number information and the product manufacturing data and feed them back to the general platform of the sensor network platform as feedback data.

The general platform of the sensor network platform may receive the feedback data and send the feedback data to the corresponding sub-platform of the sensor network platform.

The sub-platform of the sensor network platform may convert the feedback data into data files recognized by the management platform and send the data files to the corresponding sub-platform of the management platform.

The corresponding sub-platform of the management platform may receive the data files, and associate data files having the same serial number information with the combined data based on the serial number information, and then upload associated data to the general platform of the management platform.

The general platform of the management platform may receive the associated data, extract the data file based on the serial number information into the corresponding combined data in the combined dataset to form a feedback dataset, reorder the combined data in the feedback dataset based on the product manufacturing data, and upload one or more combined data that meet the requirement in the feedback dataset to any sub-platform of the service platform.

The sub-platform of the service platform may upload the combined data to the general platform of the service platform and store them.

The product manufacturing data in the feedback dataset may be the manufacturing data that may be affected by the relevant working parameters. The manufacturing data may be a yield, a strength value, a hardness value, etc. After the feedback dataset is stored in the general platform of the service platform, the user platform may retrieve the feedback dataset to understand the impact of different combined data on the product during manufacturing, as well as some manufacturing data of the products under different parameter combinations, and may select the optimal combination data based on the feedback dataset or provide a basis for further product manufacturing data analysis.

Through the above method, the most suitable combined data for product manufacturing may be found out from the combinations of a plurality of different parameters, and then we may use the combined data to improve the corresponding product manufacturing data of all manufacturing device, specifically:

After the user platform sends out a data retrieval instruction, the general platform of the service platform may send the stored combined data to the user platform.

The user platform may select combined data that meets the requirement as the optimal combined data based on the combined data, and send the optimal combined data to the general platform of the service platform. The general platform of the service platform may store the optimal combined data and send it to any sub-platform of the service platform. The sub-platform of the service platform may receive the optimal combined data and send it to the general platform of the management platform.

The general platform of the management platform may send the optimal combined data as the parameter data of all the object platforms and send to all the sub-platforms of the management platform, respectively, and the sub-platform of the management platform may store the optimal combined data and send it to the corresponding sub-platform of the sensor network platform.

The sub-platform of the sensor network platform may receive the optimal combined data and convert it into a configuration file recognized by the object platform, and send the configuration file to the general platform of the sensor network platform.

The general platform of the sensor network platform may send the configuration files to the corresponding object platforms respectively, and the object platform may receive the configuration file and replace the corresponding working parameter, and then perform manufacturing with the latest working parameter.

In some embodiments, the combined data in the feedback dataset may be reordered based on the product manufacturing data, and the one or more combined data in the feedback dataset that meet the requirement may be uploaded to any sub-platforms of the service platform, specifically:

The general platform of the management platform may store a preset threshold of the corresponding product manufacturing data.

Based on the size value of the obtained product manufacturing data, the general platform of the management platform may reorder the combined data in the feedback dataset in descending or ascending order.

Take the combined data corresponding to the product manufacturing data that is greater than or less than the preset threshold as conforming item data, and upload the first N or the last N combined data in the conforming item data to any sub-platform of the service platform, wherein N may be an integer greater than or equal to 1.

The preset threshold may be a certain fixed value set by the corresponding general platform of the management platform according to its corresponding working parameter item. Taking the product manufacturing data as the yield rate as an example, after obtaining the product manufacturing data, the combined data in the feedback dataset may be reordered in descending or ascending order based on the yield rate, and then the preset threshold may be 95%, after sorting, the combined data with a yield greater than 95% may meet the preset requirement, and then, by setting the number of values, such as taking the first three of the data, upload the corresponding combined data to any sub-platforms of the service platform, and then select some better combined data.

In some embodiments, the sub-platform of the service platform may receive the working parameter item information and perform data processing to obtain the one or more sub-parameter information, and send the one or more sub-parameter information as the parameter dataset of the working parameter item to the general platform of the management platform, specifically:

After receiving the working parameter item information, the sub-platform of the service platform may extract the value or value interval of the corresponding working parameter item.

When the value of the corresponding working parameter item is one or more, take the one or more values as one or more sub-parameter information.

And/or, when the corresponding working parameter item is a value interval, the sub-platform of the service platform may divide the value interval into several sub-intervals, and take the several sub-intervals as the one or more sub-parameter information.

The sub-platform of the service platform may arrange the obtained one or more sub-parameter information in sequence to form the parameter dataset of the working parameter item, and send the parameter dataset to the general platform of the management platform.

Further, the sub-platform of the service platform may divide the value interval into several value sub-intervals, specifically:

The sub-platform of the service platform may be preset with a fixed threshold.

After the sub-platform of the service platform extracts the value interval, the minimum interval value in the value interval may be extracted as a basic value, and a first interval maximum value may be obtained by adding the basic value and the fixed threshold, and combine the basic value and the first interval maximum value to form a first value sub-interval.

Take an Nth interval maximum value as the basic value of the (N+1)th sub-interval to calculate the (N+1)th interval maximum value, and combine the Nth interval maximum value and the (N+1)th interval maximum value to form a (N+1)th value sub-interval, wherein N is an integer greater than or equal to 1, and the (N+1)th interval maximum value may be less than or equal to the interval maximum value in the value interval.

In some embodiments, take all the working parameter items as extraction elements, extract one sub-parameter information from the parameter dataset corresponding to all the extraction elements respectively, and obtain several groups of combined data by performing permutation and combination on the sub-parameter information, sort and number all the combined data to form a combined dataset and store it, specifically:

The general platform of the management platform may determine the different obtained working parameter items as an extraction element, respectively, extract any one of the sub-parameter information from each extraction element at the same time, and arrange all the sub-parameter information extracted at a single time in order to form the combined data.

Number all the combined data and sorted according to the numbering sequence to form a combined dataset and store it, wherein the same combined data in the combined dataset retain one.

In a specific application, all the extracted sub-parameter information may be arranged according to a setting order or priority order of the working parameter items to form the combined data.

FIG. 3 is a flowchart diagram illustrating a control method of industrial Internet of Things for regulating multi-type of working parameters according to some embodiments of the present disclosure.

As shown in FIG. 3, an embodiment of the present disclosure may aim to provide a control method of Industrial Internet of Things for regulating multi-type of working parameters, comprising: the service platform, the management platform, the sensor network platform, and the object platform that interact from top to bottom.

The service platform and the management platform may be arranged in the front sub-platform layout, and the sensor network platform may be arranged in the rear sub-platform layout; the front sub-platform layout may refer to the corresponding platform is provided with the general platform and the plurality of sub-platforms, the plurality of sub-platforms may store and process data of different types or different receiving objects sent by the lower platform, respectively, the general platform may store and process the data from the plurality of sub-platforms after summarizing, and transmit the data to the upper platform; and the rear sub-platform layout may refer to the sensor network platform is provided with the general platform and the plurality of sub-platforms, and the plurality of sub-platforms may store and process data of different types or different receiving objects sent by the management platform, respectively, and the general platform may store and process the data of the plurality of sub-platforms after summarizing, and transmit the data to the object platform. The object platform may be configured as the manufacturing device with the same type in intelligent manufacturing.

The control method may include:

S1, after the user platform sends the first instruction, the general platform of the service platform may extract the plurality of working parameter item information in the first instruction, and send the plurality of working parameter item information to the different sub-platforms of the service platform, respectively; the working parameter item information may include at least the working parameter item as well as a value or a value interval corresponding to the working parameter item.

S2, the sub-platform of the service platform may receive the working parameter item information and perform data processing to obtain the one or more sub-parameter information, and send the one or more sub-parameter information as the parameter dataset of the working parameter item to the general platform of the management platform.

S3, the general platform of the management platform may obtain the parameter dataset of all the working parameter items, take all the working parameter items as the extraction elements, extract one sub-parameter information from the parameter datasets corresponding to all the extraction elements, respectively, obtain several groups of combined data by performing permutation and combination on the sub-parameter information, sort and number all the combined data to form a combined dataset and store the combined dataset, wherein the repeated combined data in the combined dataset may retain one, and the general platform of the management platform may send the combined data in the combined dataset to different sub-platforms of the management platform in order based on the combined dataset.

S4, after receiving the combined data, the sub-platform of the management platform may store the combined data by number, extract different working parameter item information of the combined data to form the plurality of working parameter item data, and package the stored number information and the plurality of working parameter item data as the execution parameter data of the object platform and send it to the sub-platform of the sensor network platform.

S5, the sub-platform of the sensor network platform may receive the execution parameter data and convert it into the configuration file recognized by the object platform, and send the configuration file to the general platform of the sensor network platform.

S6, the general platform of the sensor network platform may receive the configuration file and send it to the corresponding object platform, the object platform may receive the configuration file and adjust the working parameter based on the working parameter item data in the configuration file.

Figure 4:
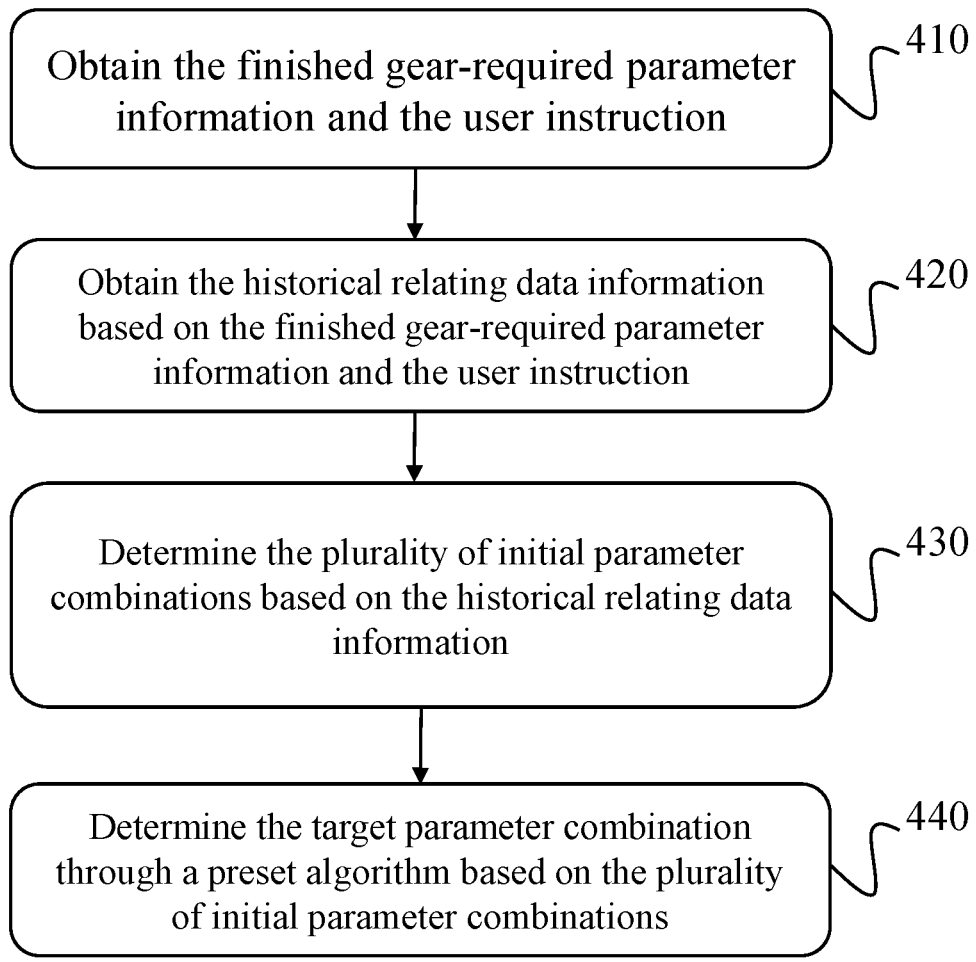
FIG. 4 is an exemplary flowchart of determining a target parameter combination according to some embodiments of the present disclosure.

FIG. 4 is an exemplary flowchart of determining a target parameter combination according to some embodiments of the present disclosure. In some embodiments, process 400 may be performed by an Industrial Internet of Things for regulating multi-type of working parameters.

In some embodiments, the manufacturing device may refer to a machining device used in the field of machining. For example, the manufacturing device may include a gear machining device, a screw machining device, a bearing machining device, or the like.

The gear machining device may refer to the machining device that needs to be used in the process of machining raw materials into finished gear on the production line. For example, gear machining device may include a gear hobbing machine, a milling machine, a gear shaper, a gear grinder, or the like.

The combined data of manufacturing device may refer to the parameter combination of machining device used in the mechanical field. For example, the combined data of the manufacturing device may include a target parameter combination of the gear machining process, the target parameter combination of the screw machining process, the target parameter combination of the bearing machining process, or the like. The finished product-required parameter information may refer to the required parameter information of the finished product after machining. For example, the finished product-required parameter information may include a finished gear-required parameter information, a finished screw-required parameter information, and a finished bearing-required parameter information.

As shown in FIG. 4, the flow 400 of determining the target parameter combination of the gear machining process of the gear machining device includes the following steps:

Step 410: obtain the finished gear required parameter information and the user instruction.

The finished gear-required parameter information may refer to the parameter information related to the quality and dimension required for the finished gear. For example, the parameter information required for the finished gear may include a count of teeth, a helix angle, wear resistance, fatigue resistance, surface smoothness, etc. of the finished gear.

In some embodiments, the processor may obtain the finished gear-required parameter information in various ways. For example, the processor may obtain the finished gear required parameter information by means of human input based on the finished gear requirement. As another example, the processor may query the database to obtain the finished gear-required parameter information based on the model of the finished gear.

The user instruction may include relating instruction for gear production. For example, the user instruction regarding the gear may include changes or variation based on the finished gear-required parameter information, related production materials determined based on the finished gear-required parameter information, or the like.

In some embodiments, the processor may obtain the user instruction based on the updated production task plan uploaded by the user.

Step 420: obtain the historical relating data information based on the finished gear required parameter information and the user instruction.

The historical relating data information may refer to the data information related to the production of similar or identical finished gear by gear machining device in a historical time. The historical relating data information may include historical finished gear-required parameter information, historical working parameter information, and the like. For example, the finished gear-required parameter information may include the number of teeth, the helix angle, the wear resistance, and the like of the historical finished gear. The historical working parameter information may include different historical forging time, normalizing temperature, quenching temperature, tempering temperature, etc. corresponding to different finished gear-required parameter information.

In some embodiments, the processor may retrieve the historical relating data information in the historical database based on a correlation vector of the finished gear-required parameter information and the user instruction. The correlation vector may be obtained through codes such as finished gear-required parameter information and production materials of the gear produced this time. The historical database may include at least one reference vector and a database of corresponding historical relating data information. The reference vector may refer to the vector obtained through codes such as finished gear-required parameter information and production material in the historical database. The processor may construct different reference vectors based on different finished gear-required parameter information and production materials in the historical database. The processor may compare the correlation vector with the reference vectors, obtain a reference vector similar to the correlation vector, and then obtain the historical relating data information corresponding to the reference vector.

Step 430: determine the plurality of initial parameter combinations based on the historical relating data information.

The initial parameter combination may refer to working parameter(s) of the gear machining device in the current finished gear processing process preset according to historical relating data information. For example, the initial parameter combination may include at least one of the forging time, the normalizing temperature, the quenching temperature, the tempering temperature, and the like.

In some embodiments, the processor may directly combine the working parameters in the historical relating data information as the initial parameter combination. In some embodiments, the processor may also modify or adjust the working parameters in the historical relating data information based on human experience, and then use them as the initial parameter combination.

Step 440: determine the target parameter combination through a preset algorithm based on the plurality of initial parameter combinations.

The target parameter combination may refer to working parameter(s) of the gear machining device that are finally determined in the finished gear processing. For example, the target parameter combination may be forging time $t_{target}$, normalizing temperature $T_{1\ target}$, quenching temperature $T_{2\ target}$, and tempering temperature $T_{3\ target}$.

In some embodiments, the processor may determine the target parameter combination through various preset algorithms. For example, the preset algorithm may include regression analysis, discriminant analysis, and the like.

In some embodiments, the processor may further determine the target parameter combination by performing multiple rounds of iterative update on the plurality of initial parameter combinations. For more content about determining the target parameter combination, please refer to FIG. 5 and related descriptions.

In some embodiments of the present disclosure, the plurality of initial parameter combinations may be obtained based on the historical relating data information, and then the target parameter combination may be determined based on the preset algorithm, which can improve the production efficiency while meeting the quality requirements of the finished gear, the processing time may be shortened, and may have beneficial to save production resources.

Figure 5:
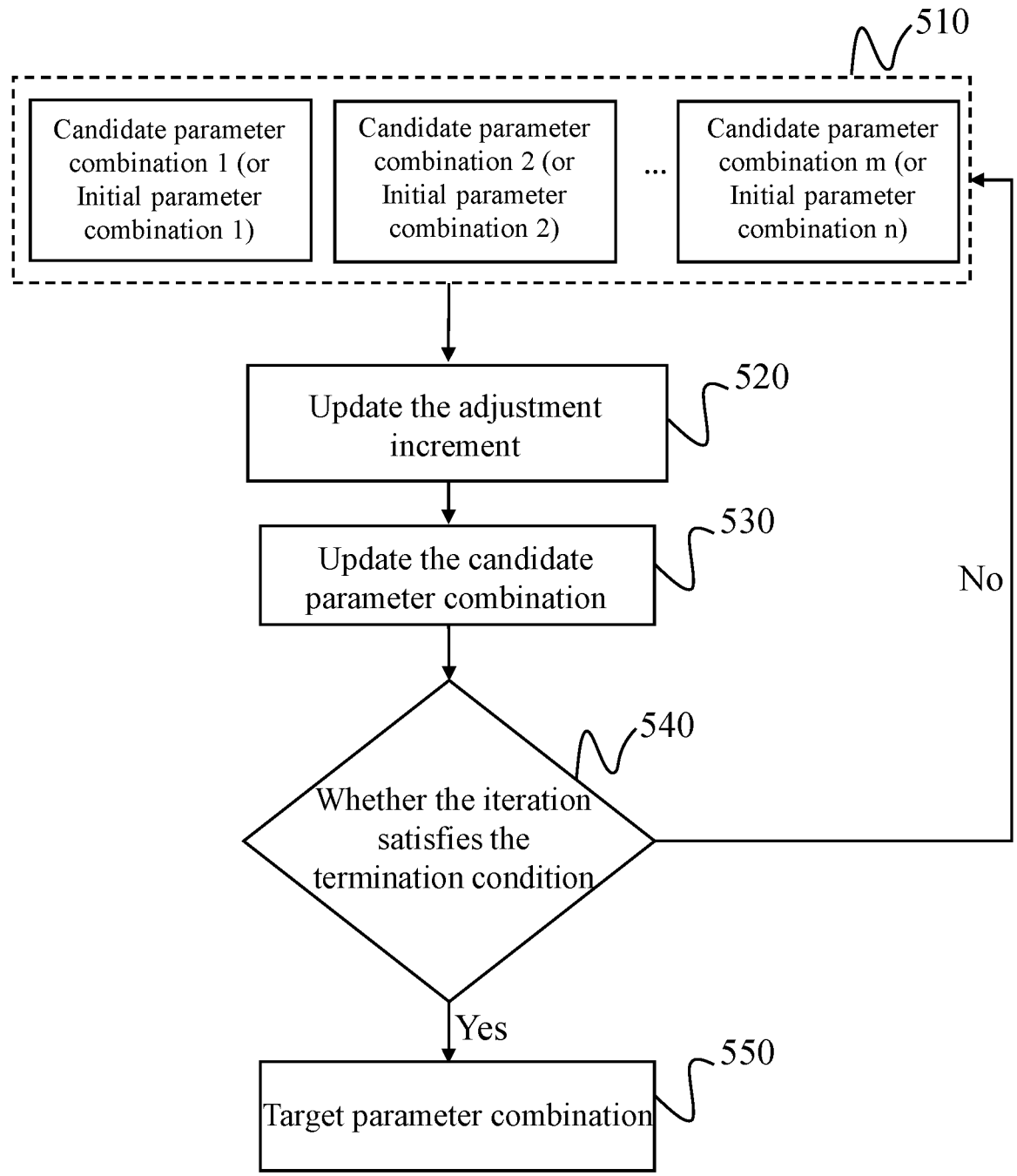
FIG. 5 is an exemplary schematic diagram illustrating performing multiple rounds of iterative update on a plurality of candidate parameter combinations according to some embodiments of the present disclosure.

FIG. 5 is an exemplary schematic diagram illustrating performing multiple rounds of iterative update on the plurality of candidate parameter combinations according to some embodiments of the present disclosure.

In some embodiments, the processor may perform multiple rounds of iterative update on the plurality of candidate parameter combinations to determine the target parameter combination, wherein in the first round of iterative update, the plurality of candidate parameter combinations may include the plurality of initial parameter combinations. At least one of the multiple rounds of iterative update may include: for at least one candidate parameter combination, updating a corresponding adjustment increment based on a relationship with the historical optimal solution, and updating the candidate parameter combination based on the adjustment increment, wherein the historical optimal solution may be determined based on an evaluation algorithm.

In some embodiments, the evaluation algorithm may include evaluating the fitness of the candidate parameter combinations based on a machine learning model, a rule, etc. For more content of related descriptions, please refer to the relevant sections below.

Candidate parameter combinations 510 may refer to working parameter combinations of the manufacturing device to be selected as the target parameter combination. As shown in FIG. 5, the plurality of candidate parameter combinations may include a candidate parameter combination 1, a candidate parameter combination 2, a candidate parameter combination m, etc., wherein m may refer to the count of candidate parameter combinations. The value of m may be preset, for example, may be set manually.

In some embodiments, each candidate parameter combination may include forging time t, normalizing temperature $T_1$, quenching temperature $T_2$, tempering temperature $T_3$, and other working parameters of the manufacturing device. In some embodiments, the candidate parameter combinations may be represented in the form of vectors. For example, the candidate parameter combination m may be expressed as $X_{m1}, X_{m2}, X_{m3}, X_{m4}, \ldots$), wherein $X_{m1}$ refers to the forging time, $X_{m2}$ refers to the normalizing temperature, $X_{m3}$ refers to the quenching Temperature, and $X_{m4}$ refers to tempering temperature, etc.

In some embodiments, during the first round of iterative update, the plurality of candidate parameter combinations may include the plurality of initial parameter combinations. As shown in FIG. 5, the plurality of initial parameter combinations may include an initial parameter combination 1, an initial parameter combination 2, an initial parameter combination n, etc., wherein n may represent the count of initial parameter combinations or the candidate parameter combinations. The value of n may be preset, for example, may be set manually.

In some embodiments, at least one of the multiple rounds of iteration may include, for at least one candidate parameter combination, updating the corresponding adjustment increment based on the relationship with the historical optimal solution, and updating the candidate parameter combination based on the adjustment increment. As shown in FIG. 5, the iterative update of the candidate parameter combination may be performed based on the following steps.

Step 520, update the adjustment increment.

The adjustment increment may refer to the update amplitude of the parameter in the candidate parameter combination. In some embodiments, the adjustment increment may include a plurality of sets, wherein each of the plurality of sets of the adjustment increments corresponds one-to-one with each set of the candidate parameter combination.

In some embodiments, each set of the adjustment increment may include a plurality of sub-increments, and each sub-increment may represent the update amplitude of each parameter in the candidate parameter combination corresponding to the adjustment increment. For example, a candidate parameter combination A may include forging time 30 min, normalizing temperature 800° C., quenching temperature 810° C., tempering temperature 400° C. and other working parameters of the manufacturing device, which may be expressed in the form of a vector as (30 min, 800° C., 810° C., 400° C.). Then the corresponding adjustment increment A may include forging time −3 min, normalizing temperature +20° C., quenching temperature −40° C., tempering temperature +15° C., and so on. In some embodiments, the adjustment increment may also be represented in the form of the vector, for example, the adjustment increment A' may be represented in the form of the vector as (−3 min, +20° C., −40° C., +15° C.).

In some embodiments, the processor may update the adjustment increment of the corresponding candidate parameter combination based on the relationship between the at least one candidate parameter combination and the historical optimal solution.

Initial values of the adjustment increments corresponding to the plurality of the candidate parameter combinations may be the same or different. The initial value of the adjustment increment may be generated based on the maximum value of the working parameter of the manufacturing device. For example, if the maximum forging time of the manufacturing device is $X_{1max}$, the maximum normalizing temperature is $X_{2max}$, the maximum quenching temperature is $X_{3max}$, and the maximum tempering temperature is $X_{4max}$, etc., the initial values of the adjustment increments corresponding to the plurality of candidate parameter combinations may be $(+0.1\ X_{1max}, -0.1\ X_{2max}, +0.1\ X_{3max}, +0.1\ X_{4max}, \ldots)$, and the like.

In some embodiments, the relationship between the candidate parameter combination A and the historical optimal solution may be represented by a difference value, or the like. For example, the updated adjustment increment may be obtained based on the difference value between the candidate parameter combination A and the individual optimal solution, the difference value between the candidate parameter combination A and the group optimal solution corresponding to the plurality of the candidate parameter combinations. Weights may be preset or determined in other ways.

In some embodiments, the historical optimal solution may refer to a working parameter combination of the manufacturing device with the highest finished product parameter score in the historical iteration process. The detailed description of finished product parameter score may be found in the related content below.

In some embodiments, the historical optimal solution may include the individual optimal solution corresponding to the candidate parameter combination, and the group optimal solution jointly corresponding to the plurality of candidate parameter combinations.

The individual optimal solution may refer to, in the iterative process up to the current round of iteration of each candidate parameter combination, the working parameter combination of the manufacturing device with the highest finished product parameter score of the plurality of candidate parameters corresponding to the candidate parameter combination. For example, the individual optimal solution of candidate parameter combination m may be represented in the form of a vector as $(X^2_{m1}, X^2_{m2}, X^2_{m3}, X^2_{m4}, \ldots)$. The vector may indicate that in the current round of iteration process, the finished product parameter score of the plurality of the candidate parameters corresponding to the candidate parameter combination m in the second round of iteration is the highest.

The group optimal solution may refer to, in the iterative process up to the current round of iteration of all the candidate parameter combinations, a working parameter combination of the manufacturing device with the highest finished product parameter score. For example, the group optimal solution may be represented in the form of vector as $(X^3_{m1}, X^3_{m2}, X^3_{m3}, X^3_{m4}, \ldots)$. The vector may indicate that in the iterative process up to the current round of iteration, the plurality of the candidate parameters corresponding to the candidate parameter combination m may have the highest finished product parameter score in the third round of iteration of all candidate parameter combinations.

The processor may perform iterative update on the candidate parameter combination based on the common influence of the individual optimal solution and the group optimal solution, which may determine the required target parameters faster, reduce the number of iterations, and improve the efficiency.

In some embodiments, the processor may determine the fitness based on the candidate parameter combination. The fitness may be a prediction finished product parameter score of the candidate parameter combination. The processor may evaluate whether the candidate parameter combination is a historical optimal solution based on the finished product parameter score.

The finished product parameter score may be an index for evaluating the quality of the finished product parameter corresponding to a certain set of candidate parameter combinations. In some embodiments, the finished product parameter score may be a real number between 0 and 100, for example, the finished product parameter score may be 95. The higher the finished product parameter score is, the better the finished product parameter is, and accordingly, the better the working parameter combination of the manufacturing device corresponding to the finished product is.

In some embodiments, the processor may determine the fitness (e.g., the finished product parameter score) based on a preset rule, model, or the like. For example, the processor may determine the finished product parameter score as the fitness.

In some embodiments, the finished product parameter score may be determined based on a prediction model. More descriptions of the prediction model may be found in FIG. 6 and its related sections.

In some embodiments, the historical optimal solution may be evaluated based on the finished product parameter score. For example, the processor may determine the finished product parameter score of the candidate parameter combination in all historical iterations based on the prediction model. The processor may select the candidate parameter combination with the highest finished product parameter score as the historical optimal solution.

In some embodiments, evaluating whether the candidate parameter is the optimal solution based on the finished product parameter score, which may quantitatively evaluate whether the candidate parameter is better, so as to efficiently select the target combination parameter and improve production efficiency.

In some embodiments, in at least one of the multiple rounds of iteration, the processor updating the adjustment increment corresponding to the at least one set of candidate parameters may include: based on the weights of difference value between the candidate parameter combination in the previous round and the individual optimal solution, as well as the difference value between the candidate parameter combination and the historical group optimal solution, and update the adjustment increment. The weights may be preset manually.

For example, in the i-th round of update, the difference value between the candidate parameter combination $A_{i-1}$ of the (i−1)th round and the corresponding individual optimal solution may include forging time+10 minutes, normalizing temperature +50° C., quenching temperature −45° C., tempering temperature −20° C., etc., the weight may be 0.4; the difference value with the group optimal solution may include forging time −5 minutes, normalizing temperature +30° C., quenching temperature −20° C., tempering temperature +10° C., etc., the weight may be 0.6; the adjustment increment to be updated may be forging time −3 minutes, normalizing temperature +20° C., quenching temperature −40° C., tempering temperature +15° C., etc. Then the updated adjustment increment of the i-th round may be expressed as (−2 min, +58° C., −70° C., +13° C.).

In some embodiments, the updated adjustment increment obtained in the i-th round may be screened to determine the to-be-updated adjustment increment in the (i+1)th round. For example, if the updated adjustment increment obtained in the i-th round is within a preset range, it is regarded as the to-be-updated adjustment increment in the (i+1)th round.

Step 530, update the candidate parameter combination.

In some embodiments, updating the candidate parameter combination based on the adjustment increment may include the following steps.

In the first round of iteration, the initial parameter combination may be used as the candidate parameter combination, and the initial parameter combination may be updated based on the initial adjustment increment, wherein the initial adjustment increment may be an updated adjustment increment, which may be preset based on historical experience.

For example, the initial candidate parameter combination A may be expressed as (30 min, 800° C., 810° C., 400° C.), and the corresponding initial adjustment increment A' may be expressed as (−3 min, +20° C., −40° C., +15° C.). Then the updated candidate parameter combination $A_1$ may be expressed as (27 min, 820° C., 770° C., 415° C.).

When in the i-th (i>1) round of updating, the processor may update the candidate parameter combination $A_{i-1}$ obtained in the (i−1)th round based on the adjustment increment of the i-th round to obtain the candidate parameter combination $A_i$ of the i-th round.

In some embodiments, the processor may further screen the updated candidate parameter combinations obtained in the i-th round to determine the to-be-updated candidate parameter combinations in the (i+1)th round. For example, the processor may take the candidate parameter combination whose fitness is greater than the threshold after the i-th round of updating as the to-be-updated candidate parameter combination in the (i+1)th round.

Step 540: determine whether to end the iteration based on whether the iteration satisfies the termination condition.

In some embodiments, the iteration termination condition may include that the finished product parameter score meets a preset requirement, wherein the preset requirement may be set manually, for example, the finished product parameter score may be greater than 85, or the like.

In some embodiments, the iteration termination condition may further include that the number of iterations reaches a specified number of iterations, wherein the specified number of iterations may be set manually, for example, the specified number of iterations may be 20, or the like.

In some embodiments, the iteration termination condition may also be convergence of the finished product parameter score.

In some embodiments, after each round of iterative update is completed, determining whether at least one of the plurality of the candidate parameter combinations satisfies the iteration termination condition. If satisfying the iteration termination condition, the iteration may be ended, and the historical optimal solution may be determined as the target parameter combination 550. If it does not satisfy the iteration termination condition, proceed to the next iteration until the iteration termination condition is satisfied.

The plurality of the candidate parameter combinations may be continuously updated in an iterative manner, and the candidate parameter combination may be continuously optimized. Thereby, the target parameter combination that optimizes the parameters of the finished product may be determined, which may improve the product quality and save the production cost while satisfying the production needs.

Figure 6:
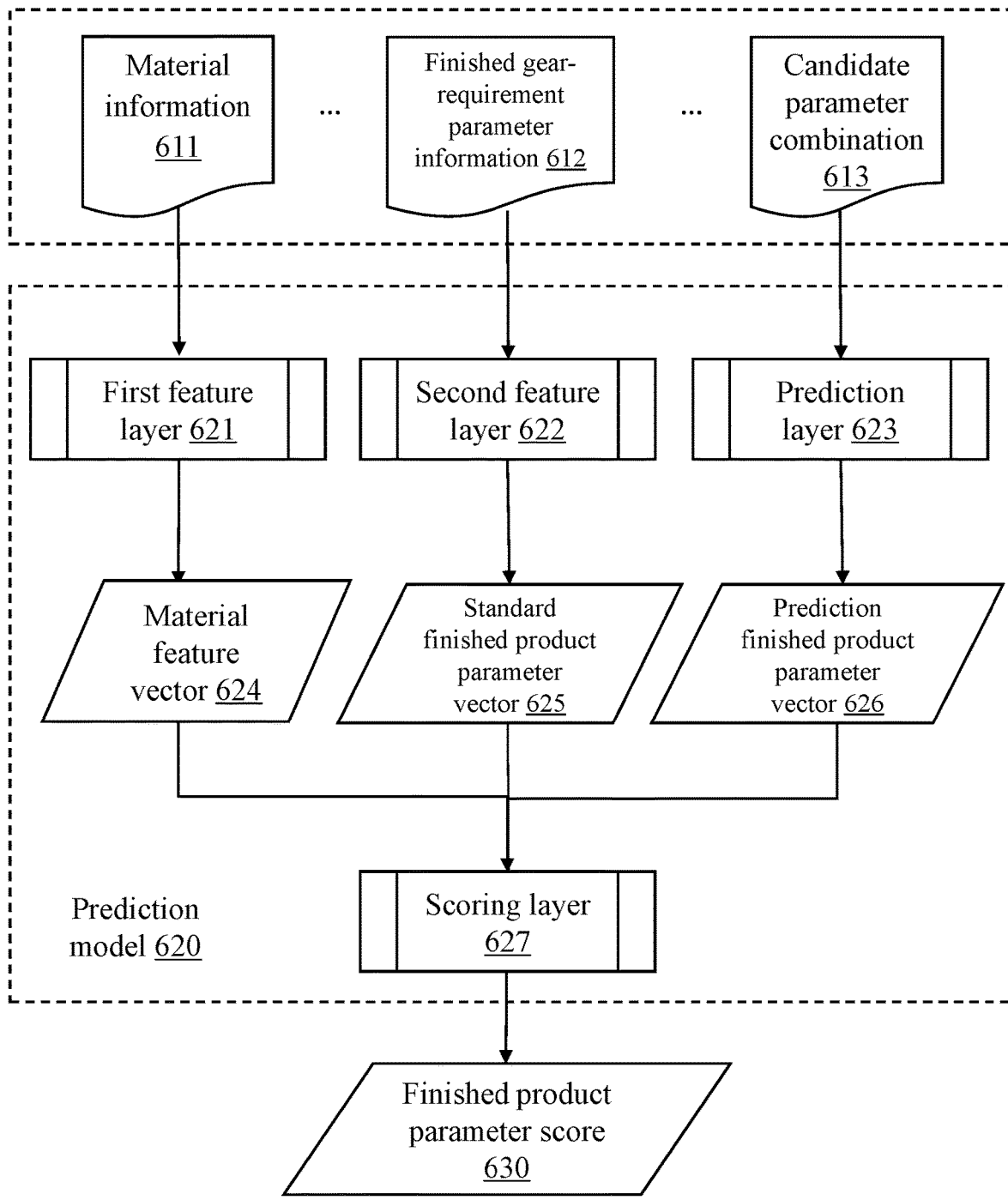
FIG. 6 is an exemplary schematic diagram illustrating a prediction model according to some embodiments of the present disclosure.

FIG. 6 is an exemplary schematic diagram illustrating a prediction model according to some embodiments of the present disclosure.

In some embodiments, the processor may process the material information, finished gear required parameter information, candidate parameter combinations, etc. based on a prediction model to predict finished product parameter score. The prediction model 620 may be the machine learning model.

In some embodiments, the prediction model 620 may include a neural network model, a deep neural network model, or the like. The input of the prediction model 620 may include material information 611, a finished gear-required parameter information 612, a candidate parameter combination 613, or the like. The output of the prediction model may include a finished product parameter score 630.

The material information 611 may refer to information about raw material used for producing gear. For example, the material information may be that the steel used for production is a quenched and tempered steel.

In some embodiments, the prediction model 620 may be obtained by training a plurality of labeled training samples. For example, the plurality of labeled training samples may be input into the initial prediction model, a loss function may be constructed from the labels and the result of the initial prediction model, and the parameter of the initial prediction model may be iteratively updated based on the loss function. When the loss function of the initial prediction model satisfies the preset condition, the model training may be completed, and a trained prediction model may be obtained. The preset condition may be that the loss function converges, the number of iterations may reach a threshold, or the like.

In some embodiments, the first training sample may include a sample material information, a sample finished gear-required parameter information, and sample candidate parameter combinations. The label may be a sample finished product parameter score. The material information, the finished gear-required parameter information and the candidate parameter combinations corresponding to the historical processing may be obtained through the historical relating data information. The label may be obtained by manual labeling.

In some embodiments, the prediction model may include a first feature layer, a second feature layer, a prediction layer, a scoring layer, or the like. The first feature layer may be used to process the material information to determine a material feature vector. The second feature layer may be used to process the required parameter information of the finished gear to determine a standard finished product parameter vector. The prediction layer may be used to process the candidate parameter combination to determine a prediction finished product parameter vector. The scoring layer may be used to process the material feature vector, the standard finished product parameter vector, and the prediction finished product parameter vector to predict the finished product parameter score.

The first feature layer 621 may be a model for extracting material feature vector. In some embodiments, the first feature layer 621 may include the deep neural network model, or the like.

In some embodiments, the input to the first feature layer 621 may include the material information 611. The output of the first feature layer 621 may include a material feature vector 624.

The material feature vector may refer to a feature vector that reflects any feature information in the material information. For example, the material feature vector may include any features such as material type, carbon content, hardness, etc.

The second feature layer 622 may be a model for extracting the standard finished product parameter vector. In some embodiments, the second feature layer 622 may include the deep neural network model, or the like.

In some embodiments, the input of the second feature layer 622 may include the finished gear-required parameter information 612. The output of the second feature layer 622 may include the standard finished product parameter vector 625.

The standard finished product parameter vector may refer to the feature vector that reflects any feature information in the finished gear-required parameter information. For example, the standard finished product parameter vector may include any features such as the number of teeth, helix angle, wear resistance, fatigue resistance, surface smoothness, etc. of the finished gear.

The prediction layer 623 may be a model for extracting the prediction finished product parameter vector. In some embodiments, the prediction layer 623 may include the deep neural network model, or the like.

In some embodiments, the input of the prediction layer 623 may include the candidate parameter combination 613. The output of the prediction layer 623 may include the prediction finished product parameter vector 626.

The prediction finished product parameter vector may refer to the feature vector that reflects any feature information in the candidate parameter combination. For example, the prediction finished product parameter vector may include any features such as forging time, normalizing temperature, quenching temperature, tempering temperature, etc.

The scoring layer 627 may be a model for predicting the finished product parameter score. In some embodiments, the scoring layer 627 may include the deep neural network model, or the like.

In some embodiments, the input of the scoring layer 627 may include the material feature vector 624, the standard finished product parameter vector 625, the prediction finished product parameter vector 626, or the like. The output of the scoring layer 627 may include the finished product parameter score 630.

In some embodiments, the first feature layer 621, the second feature layer 622, the prediction layer 623, and the scoring layer 627 may be obtained through joint training.

In some embodiments, the second training sample for joint training may include the sample material information, the sample finished gear-required parameter information, and the sample candidate parameter combination, and the label may be the sample finished product parameter score. The label may be manually scored based on the quality level of the product (e.g., qualified, defective, etc.). The quality level of the product may be obtained based on an actual production.

In some embodiments, the sample material information may be input into the first feature layer to obtain the material feature vector output by the first feature layer. The sample finished gear required parameter information may be input into the second feature layer to obtain the standard finished product parameter vector output by the second feature layer. The sample candidate parameter combination may be input into the prediction layer to obtain the prediction finished product parameter vector output by the prediction layer. The material feature vector, the standard finished product parameter vector, and the prediction finished product parameter vector may be used as a training sample data, and input into the scoring layer to obtain the finished product parameter score output by the scoring layer. The loss function may be constructed based on the sample finished product parameter score and the finished product parameter score output by the scoring layer, and the parameters of the first feature layer, the second feature layer, the prediction layer and the scoring layer may be updated synchronously. Through the parameter updating, the trained first feature layer, second feature layer, prediction layer and scoring layer may be obtained.

Extracting corresponding vectors respectively from the material information, the finished gear required parameter information, and the candidate parameter combination inputted into the prediction model through the first feature layer, the second feature layer, and the prediction layer, and then the finished product parameter score may be obtained through the scoring layer, which may effectively improve the accuracy of the final output parameter score of the finished product.

In some embodiments of the present disclosure, predicting the finished product parameter score through the prediction model may be beneficial to improve the accuracy of the predicted finished product parameter score, and may also shorten production time and save production resources.

Those of ordinary skill in the art may realize that the units and algorithm steps of each example described in conjunction with the embodiments disclosed herein may be implemented by an electronic hardware, a computer software, or a combination of the two. In order to clearly illustrate the interchangeability of the hardware and the software, the components and steps of each example have been generally described in terms of functions in the above description. Whether these functions are performed in the hardware or the software depends on the specific application and the design constraints of the technical solution. Skilled artisans may implement the described functionality using different methods for each particular application, but such implementations should not be considered beyond the scope of the present disclosure.

In the several embodiments provided in the present disclosure, it should be understood that the disclosed apparatus and method may be implemented in other manners. For example, the apparatus embodiments described above may be only illustrative. For example, the division of the units may be only a logical function division, there may be other division methods in actual implementation, For example, a plurality of units or components may be combined or may be integrated into another system, or some features may be ignored, or not implemented. In addition, the shown or discussed mutual coupling or direct coupling or communication connection may be indirect coupling or communication connection through some interfaces, devices or units, and may also be electrical, mechanical or other forms of connection.

The units described as separate components may or may not be physically separated. Those of ordinary skill in the art may realize that the units and algorithm steps of each example described in conjunction with the embodiments disclosed herein may be implemented by the electronic hardware, the computer software or the combination of the two. In order to clearly illustrate the interchangeability of the hardware and the software, the components and steps of each example have been generally described in terms of functions in the above description. Whether these functions are performed in the hardware or the software depends on the specific application and the design constraints of the technical solution. Skilled artisans may implement the described functionality using different methods for each particular application, but such implementations should not be considered beyond the scope of this description.

In addition, each functional unit in each embodiment of the present disclosure may be integrated into one processing unit, or each unit may physically exist alone, or two or more units may be integrated into one unit. The above-mentioned integrated units may be implemented in the form of hardware, or may be implemented in the form of software functional units.

If the integrated unit is implemented in the form of a software functional unit and sold or used as an independent product, it may be stored in a computer-readable storage medium. Based on such understanding, the technical solutions of the present disclosure may be essentially or parts that contribute to the prior art, or all or part of the technical solutions may be embodied in the form of software products. The computer software product may be stored in a storage medium includes several instructions for causing a computer device (which may be a personal computer, a server, or a grid device, etc.) to execute all or part of the steps of the methods described in the various embodiments of the present disclosure. The aforementioned storage medium may includes: U disk, removable hard disk, Read-Only Memory (e.g., ROM, Read-Only Memory), Random Access Memory (e.g., RAM, Random Access Memory), magnetic disk or optical disk and other media that can store program codes.

The specific embodiments described above further describe the purpose, technical solutions and beneficial effects of the present disclosure in detail. It should be understood that the above descriptions are only specific implementations of the present disclosure, and are not intended to limit the scope of the present disclosure. Any modification, equivalent replacement, improvement, etc. made within the spirit and principle of the present disclosure shall be included within the protection scope of the present disclosure.

What is claimed is:

1. An Industrial Internet of Things for automatically controlling working parameters of a manufacturing device, comprising: an obtaining module and a determination module, wherein,
the obtaining module is configured to obtain a finished product-required parameter information and a user instruction, wherein the finished product-required parameter information includes finished gear-required parameter information of a gear machining device; and
the determination module is configured to:
obtain historical relating data information based on the finished gear-required parameter information and the user instruction;
determine a plurality of initial parameter combinations based on the historical relating data information, wherein the initial parameter combination includes at least one of forging time, normalizing temperature, quenching temperature, and tempering temperature;
determine a target parameter combination of a gear processing process by a preset algorithm based on the plurality of initial parameter combinations; and
generate combined data of the manufacturing device based on at least one of the target parameter combination of the gear processing process, a target parameter combination of a screw machining process, and a target parameter combination of a bearing machining process.

2. The Industrial Internet of Things for automatically controlling working parameters of a manufacturing device of claim 1, wherein the determination module is further configured to:
perform multiple rounds of iterative updates on a plurality of candidate parameter combinations to determine the target parameter combination, wherein, in a first round of iterative update, the plurality of candidate parameter combinations include a plurality of initial parameter combinations; and
at least one of the multiple rounds of iterative includes: for one of the candidate parameter combinations, updating a corresponding adjustment increment based on a relationship of the candidate parameter combination and a historical optimal solution, and updating the candidate parameter combination based on the adjustment increment, wherein the historical optimal solution is determined based on an evaluation algorithm.

3. The Industrial Internet of Things for automatically controlling working parameters of a manufacturing device of claim 2, wherein the historical optimal solution includes an individual optimal solution corresponding to the candidate parameter combination, and a group optimal solution jointly corresponding to the plurality of candidate parameter combinations.

4. The industrial Internet of Things for automatically controlling working parameters of a manufacturing device of claim 2, wherein the adjustment increment represents an update amplitude of parameters in the candidate parameter combination; a plurality of adjustment increments corresponds one-to-one with the plurality of candidate parameter combinations; and
each of the plurality of the adjustment increments includes a plurality of sub-increments, and each sub-increment represents an update amplitude of each parameter in a candidate parameter combination corresponding to the each of the plurality of the adjustment increments.

5. The Industrial Internet of Things for automatically controlling working parameters of a manufacturing device of claim 2, wherein the determination module is further configured to:
determine a fitness based on the candidate parameter combination, wherein the fitness is a predicted finished product parameter score of the candidate parameter combination; and
evaluate whether the candidate parameter combination is the historical optimal solution based on the finished product parameter score.

6. The Industrial Internet of Things for automatically controlling working parameters of a manufacturing device of claim 5, wherein the determination module is further configured to:
predict the finished product parameter score based on processing of material information, the finished gear-required parameter information, and the candidate parameter combination by a prediction model, wherein the prediction model is a machine learning model.

7. The Industrial Internet of Things for automatically controlling working parameters of a manufacturing device of claim 6, wherein the prediction model includes a first feature layer, a second feature layer, a prediction layer, and a scoring layer, wherein
the first feature layer is configured to process the material information and determine a material feature vector;
the second feature layer is configured to process the finished gear-required parameter information and determine a standard finished product parameter vector;
the prediction layer is configured to process the candidate parameter combination and determine a prediction finished product parameter vector; and
the scoring layer is configured to predict the finished product parameter score by processing the material feature vector, the standard finished product parameter vector, and the prediction finished product parameter vector.

8. The Industrial Internet of Things for automatically controlling working parameters of a manufacturing device of claim 1, comprising:
a user platform, a service platform, a management platform, a sensor network platform, and an object platform that interacts from top to bottom; wherein
the obtaining module is executed by the user platform and the service platform, and the determination module is executed by the user platform, the service platform, the management platform, the sensor network platform, and the object platform;
the service platform and the management platform are arranged in a front sub-platform layout, and the sensor network platform is arranged in a rear sub-platform layout, wherein
the front sub-platform layout means that each of the service platform and the management platform is provided with a general platform and a plurality of sub-platforms, the plurality of sub-platforms store and process data of different types or different receiving objects sent by a lower platform, respectively, and the general platform summarizes, stores, and processes data from the plurality of sub-platforms, and transmits the processed data to an upper platform; and the rear sub-platform layout means that the sensor network platform is provided with a general platform and a plurality of sub-platforms, and the plurality of the sub-platforms store and process data of different types or different receiving objects sent by the management platform, respectively, and the general platform summarizes, stores and processes data from the plurality of sub-platforms, and transmits the processed data to the object platform; and the object platform is configured as the manufacturing device with the same type in intelligent manufacturing.

9. The Industrial Internet of Things for automatically controlling working parameters of a manufacturing device of claim 8, wherein the user instruction includes a first instruction;

after the user platform sends the first instruction, the general platform of the service platform extracts a plurality of working parameter item information in the first instruction, and sends the plurality of working parameter item information to different sub-platforms of the service platform, respectively, the working parameter item information includes at least a working parameter item as well as a value or a value interval corresponding to the working parameter item;

the sub-platform of the service platform receives the working parameter item information and performs data processing to obtain one or more sub-parameter information, and sends the one or more sub-parameter information as a parameter dataset of the working parameter item to the general platform of the management platform;

the general platform of the management platform obtains the parameter datasets of all the working parameter items, takes all the working parameter items as extraction elements, extracts one sub-parameter information from the parameter datasets corresponding to all the extraction elements respectively, obtains several groups of combined data by performing permutation and combination on the sub-parameter information, sorts and numbers all the combined data to form a combined dataset and stores the combined dataset, wherein repeated combined data in the combined dataset retains one; and the general platform of the management platform sends the combined data in the combined dataset to the different sub-platforms of the management platform in order based on the combined dataset;

after receiving the combined data, a sub-platform of the management platform stores the combined data by number, extracts different working parameter item information of the combined data to form a plurality of working parameter item data, and packages stored number information and the plurality of working parameter item data as execution parameter data of the object platform and send it to the sub-platform of the sensor network platform;

the sub-platform of the sensor network platform receives the execution parameter data and converts it into a configuration file recognized by the object platform, and sends the configuration file to the general platform of the sensor network platform; and the general platform of the sensor network platform receives the configuration file and sends it to the corresponding object platform, the object platform receives the configuration file and adjusts a working parameter based on the working parameter item data in the configuration file.

10. The Industrial Internet of Things for automatically controlling working parameters of a manufacturing device of claim 9, wherein, after adjusting the working parameter based on the configuration file, the object platform obtains product manufacturing data under the working parameter, extracts the number information in the configuration file, packages the number information and the product manufacturing data, and feedback the number information and the product manufacturing data to the general platform of the sensor network platform as feedback data;

the general platform of the sensor network platform receives the feedback data and sends the feedback data to the corresponding sub-platform of the sensor network platform;

the sub-platform of the sensor network platform converts the feedback data into a data file recognized by the management platform and sends the data file to the corresponding sub-platform of the management platform;

the corresponding sub-platform of the management platform receives the data file, associates the data file with the same number information with the combined data based on the number information, and uploads associated data to the general platform of the management platform;

the general platform of the management platform receives the associated data, extracts the data file based on the number information into the corresponding combined data in the combined dataset to form a feedback dataset, reorders the combined data in the feedback dataset based on the product manufacturing data, and uploads one or more combined data that meet a requirement in the feedback dataset to any sub-platform of the service platform; and the sub-platform of the service platform uploads the combined data to the general platform of the service platform and stores it.

11. A control method of an Industrial Internet of Things for automatically controlling working parameters of a manufacturing device, comprising:

obtaining a finished product-required parameter information and a user instruction, wherein the finished product-required parameter information includes finished gear-required parameter information of a gear machining device;

obtaining historical relating data information based on the finished gear-required parameter information and the user instruction;

determining a plurality of initial parameter combinations based on the historical relating data information, wherein the initial parameter combination includes at least one of forging time, normalizing temperature, quenching temperature, and tempering temperature;

determining a target parameter combination of a gear processing process by a preset algorithm based on the plurality of initial parameter combinations; and generating combined data of the manufacturing device based on at least one of the target parameter combination of the gear processing process, a target parameter combination of a screw machining process, and a target parameter combination of a bearing machining process.

12. The control method of the Industrial Internet of Things for automatically controlling working parameters of a manufacturing device of claim 11, wherein the determining a target parameter combination of a gear processing process by a preset algorithm based on the plurality of initial parameter combinations includes:
performing multiple rounds of iterative updates on a plurality of candidate parameter combinations to determine the target parameter combination, wherein in a first round of iterative update, the plurality of candidate parameter combinations include a plurality of initial parameter combinations; and
at least one of the multiple rounds of iterative including:
for one of the candidate parameter combinations, updating a corresponding adjustment increment based on a relationship of the candidate parameter combination and a historical optimal solution, and updating the candidate parameter combination based on the adjustment increment, wherein the historical optimal solution is determined based on an evaluation algorithm.

13. The control method of the Industrial Internet of Things for automatically controlling working parameters of a manufacturing device of claim 12, wherein the historical optimal solution includes an individual optimal solution corresponding to the candidate parameter combination, and a group optimal solution jointly corresponding to the plurality of candidate parameter combinations.

14. The control method of the Industrial Internet of Things for automatically controlling working parameters of a manufacturing device of claim 12, wherein the adjustment increment represents an update amplitude of parameters in the candidate parameter combination; a plurality of adjustment increments corresponds one-to-one with the plurality of candidate parameter combinations; and
each of the plurality of the adjustment increments includes a plurality of sub-increments, and each sub-increment represents an update amplitude of each parameter in a candidate parameter combination corresponding to the each of the plurality of the adjustment increments.

15. The control method of the Industrial Internet of Things for automatically controlling working parameters of a manufacturing device of claim 12, wherein the evaluation algorithm includes:
determining a fitness based on the candidate parameter combination, wherein the fitness is a predicted finished product parameter score of the candidate parameter combination; and
evaluating whether the candidate parameter combination is the historical optimal solution based on the finished product parameter score.

16. The control method of the Industrial Internet of Things for automatically controlling working parameters of a manufacturing device of claim 15, comprising:
predicting the finished product parameter score based on processing of material information, the finished gear-required parameter information, and the candidate parameter combination by a prediction model, wherein the prediction model is a machine learning model.

17. The control method of the Industrial Internet of Things for automatically controlling working parameters of a manufacturing device of claim 16, wherein the prediction model includes a first feature layer, a second feature layer, a prediction layer, and a scoring layer, wherein the first feature layer is configured to process the material information and determine a material feature vector;
the second feature layer is configured to process the finished gear-required parameter information and determine a standard finished product parameter vector;
the prediction layer is configured to process the candidate parameter combination and determine a prediction finished product parameter vector; and
the scoring layer is configured to predict the finished product parameter score by processing the material feature vector, the standard finished product parameter vector, and the prediction finished product parameter vector.

18. The control method of the Industrial Internet of Things for automatically controlling working parameters of a manufacturing device of claim 11, wherein the Industrial Internet of Things for automatically controlling working parameters of a manufacturing device comprises a user platform, a service platform, a management platform, a sensor network platform, and an object platform that interacts from top to bottom;
the service platform and the management platform are arranged in a front sub-platform layout, and the sensor network platform is arranged in a rear sub-platform layout, wherein
the front sub-platform layout means that each of the service platform and the management platform is provided with a general platform and a plurality of sub-platforms, the plurality of sub-platforms store and process data of different types or different receiving objects sent by a lower platform, respectively, and the general platform summarizes, stores, and processes data from the plurality of sub-platforms, and transmits the processed data to an upper platform; and
the rear sub-platform layout means that the sensor network platform is provided with a general platform and a plurality of sub-platforms, and the plurality of the sub-platforms store and process data of different types or different receiving objects sent by the management platform, respectively, and the general platform summarizes, stores and processes data from the plurality of sub-platforms, and transmits the processed data to the object platform; and
the object platform is configured as the manufacturing device with the same type in intelligent manufacturing.

19. The control method of the Industrial Internet of Things for automatically controlling working parameters of a manufacturing device of claim 18, wherein
the user instruction includes a first instruction;
after the user platform sends the first instruction, by the general platform of the service platform, extracting a plurality of working parameter item information in the first instruction, and sending the plurality of working parameter item information to different sub-platforms of the service platform, respectively, the working parameter item information including at least a working parameter item as well as a value or a value interval corresponding to the working parameter item;
by the sub-platform of the service platform, receiving the working parameter item information and performing data processing to obtain one or more sub-parameter information, and sending the one or more sub-parameter information as a parameter dataset of the working parameter item to the general platform of the management platform;

by the general platform of the management platform, obtaining the parameter datasets of all the working parameter items, taking all the working parameter items as extraction elements, extracting one sub-parameter information from the parameter datasets corresponding to all the extraction elements respectively, obtaining several groups of combined data by performing permutation and combination on the sub-parameter information, sorting and numbering all the combined data to form a combined dataset and storing the combined dataset, wherein repeated combined data in the combined dataset retains one, and the general platform of the management platform sends the combined data in the combined dataset to the different sub-platforms of the management platform in order based on the combined dataset;

after receiving the combined data, by a sub-platform of the management platform, storing the combined data by number, extracting different working parameter item information of the combined data to form a plurality of working parameter item data, and packaging stored number information and the plurality of working parameter item data as execution parameter data of the object platform and sending it to the sub-platform of the sensor network platform;

by the sub-platform of the sensor network platform, receiving the execution parameter data and converting it into a configuration file recognized by the object platform, and sending the configuration file to the general platform of the sensor network platform; and by the general platform of the sensor network platform, receiving the configuration file and sending it to the corresponding object platform, the object platform receiving the configuration file and adjusting a working parameter based on the working parameter item data in the configuration file.

20. A non-transitory computer-readable storage medium, wherein the storage medium stores computer instructions, and when the computer instructions are executed by a processor, a computer realizes the control method of the Industrial Internet of Things for automatically controlling working parameters of a manufacturing device of claim 11.

* * * * *